United States Patent [19]
Rakov

[11] Patent Number: 5,914,578
[45] Date of Patent: Jun. 22, 1999

[54] METHOD AND SYSTEMS FOR ELECTRICAL DRIVE CONTROL

[76] Inventor: Mikhail A. Rakov, 1028 Marcussen Dr., Menlo Park, Calif. 94025

[21] Appl. No.: 08/774,938

[22] Filed: Dec. 19, 1996

[51] Int. Cl.[6] .................................. H02P 7/00; G05B 1/02
[52] U.S. Cl. .......................... 318/606; 318/608; 318/721; 318/723
[58] Field of Search ..................... 318/138, 254, 318/437, 439, 606, 607, 608, 700, 720, 721, 723, 724

[56] References Cited

U.S. PATENT DOCUMENTS

| 4,479,078 | 10/1984 | Kidd et al. | 318/254 |
|---|---|---|---|
| 4,692,674 | 9/1987 | Packard et al. | 318/254 |
| 5,329,195 | 7/1994 | Horber et al. | 318/254 X |
| 5,469,032 | 11/1995 | Otake | 318/439 |
| 5,532,559 | 7/1996 | Yoo | 318/254 |

FOREIGN PATENT DOCUMENTS

| 275529 | 7/1970 | U.S.S.R. |
|---|---|---|
| 315274 | 9/1971 | U.S.S.R. |
| 391725 | 7/1973 | U.S.S.R. |
| 394749 | 8/1973 | U.S.S.R. |

OTHER PUBLICATIONS

Werner Leonhard, "Control of Electrical Drives", 2nd ed., *Springer* (1966), pp. 75–77 and pp. 155–177.

J.R. Hendershot Jr., T. Miller, "Design of Brushless Permanent–Magnet Motors", *Magna Physics Publishing* (1994), pp. 1–1 through 1–12.

T. Kenjo, "Electrical Motors and their Controls", *Oxford University Press* (1994), pp. 87–96.

T. Kenjo, "Power Electronics for the Microprocessor Age", *Oxford University Press* (1994), pp. 170–199.

*Primary Examiner*—Bentsu Ro
*Attorney, Agent, or Firm*—Leo F. Costello

[57] ABSTRACT

An electrical drive control system includes a controlled drive, an auxiliary generator, a control unit, and a power unit. The rotors of the controlled drive and of the auxiliary generator are connected so that rotation of controlled drive causes a corresponding rotation of the auxiliary generator. The control unit receives a first reference signal having a first frequency. The auxiliary generator receives a second reference signal having a second frequency. The control unit may generate the second reference signal. In response to the second reference signal, the auxiliary generator generates a primary information signal having a phase shift that is indicative of the rotational position of a rotor of the auxiliary generator and the controlled drive. The control unit receives a user selected position command indicative of a selected position of the rotor. In response to the difference between the selected and determined positions of the rotor, the control unit generates control signals for controlling the power unit to adjust the drive signal to the controlled drive.

20 Claims, 7 Drawing Sheets

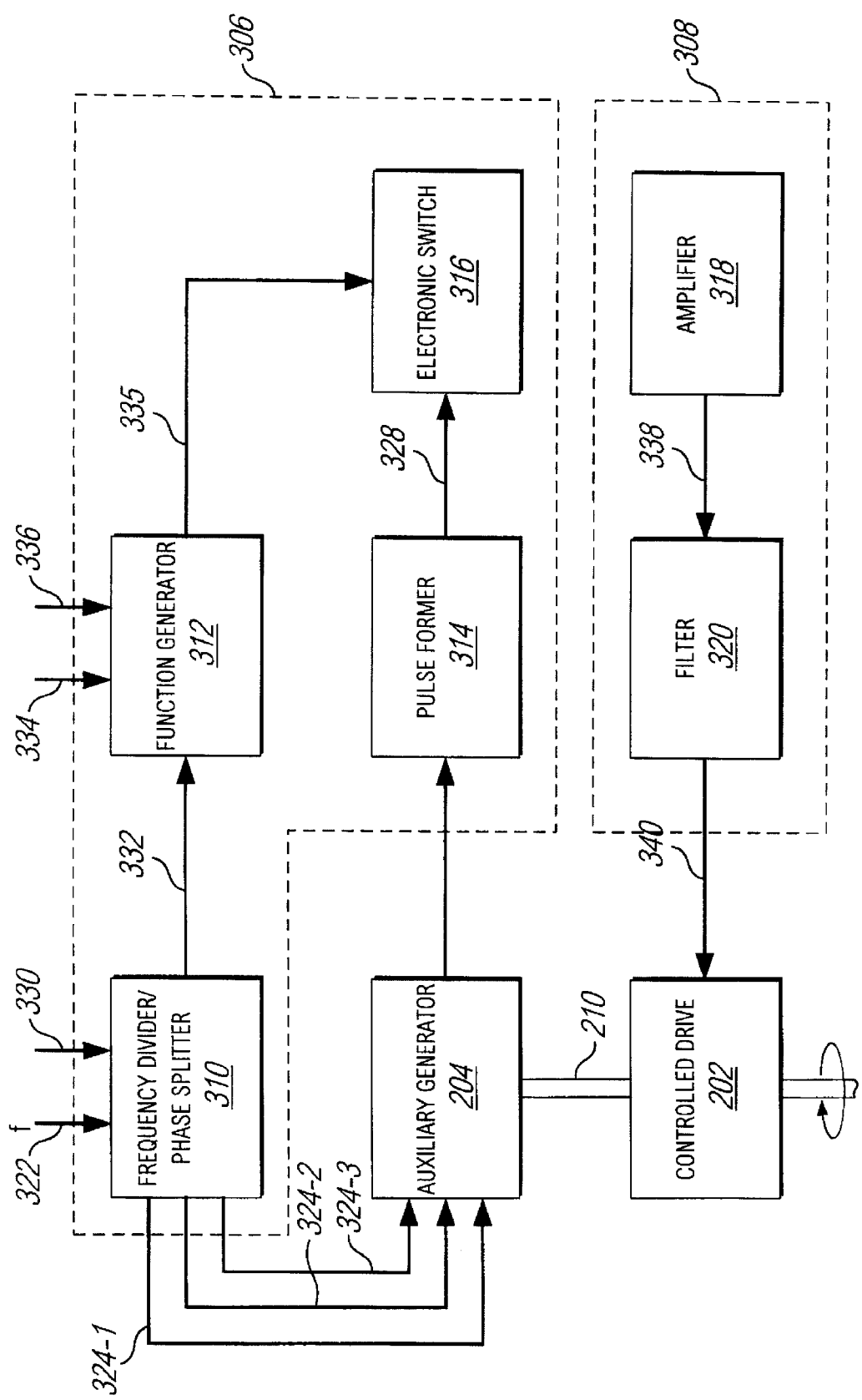

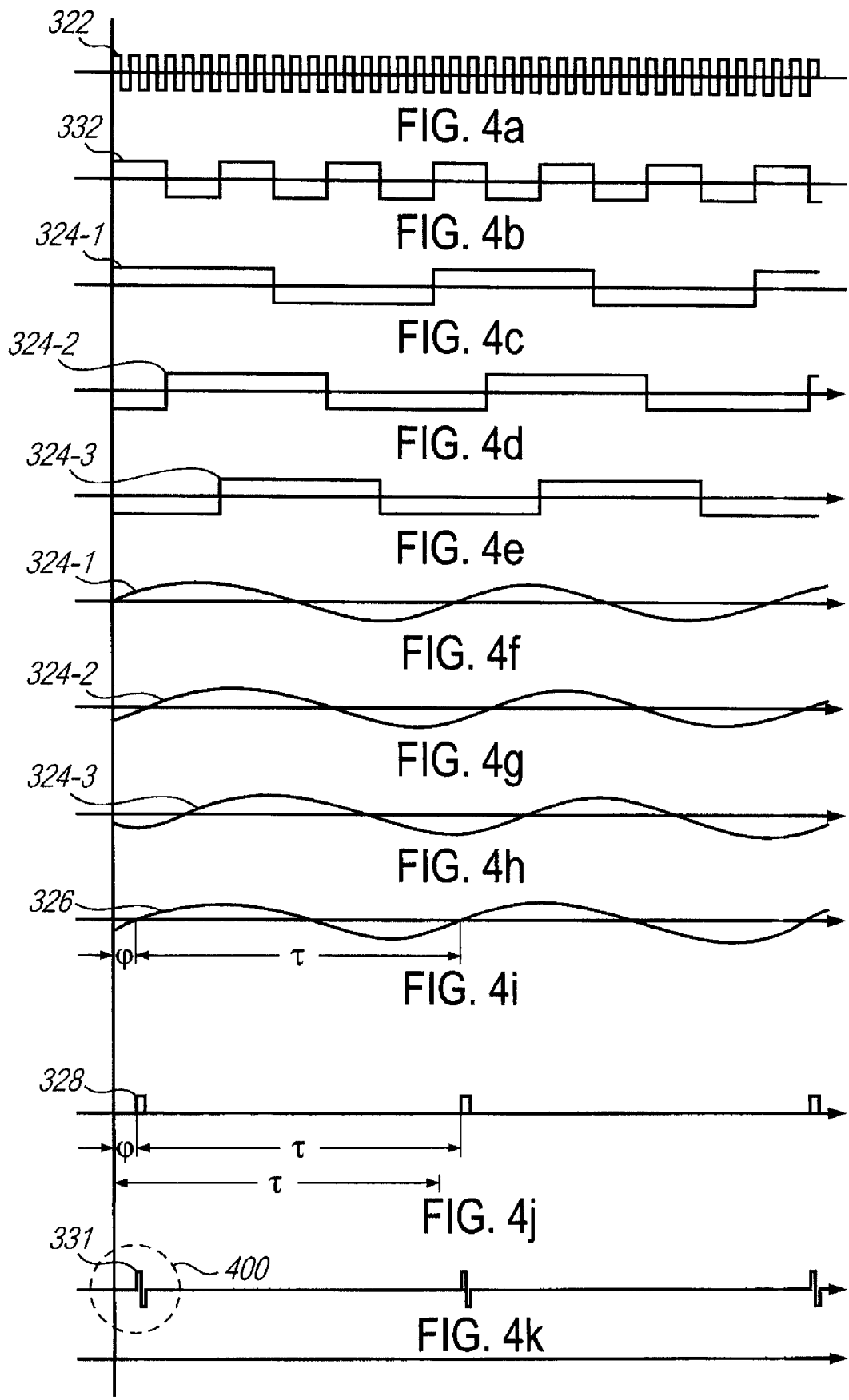

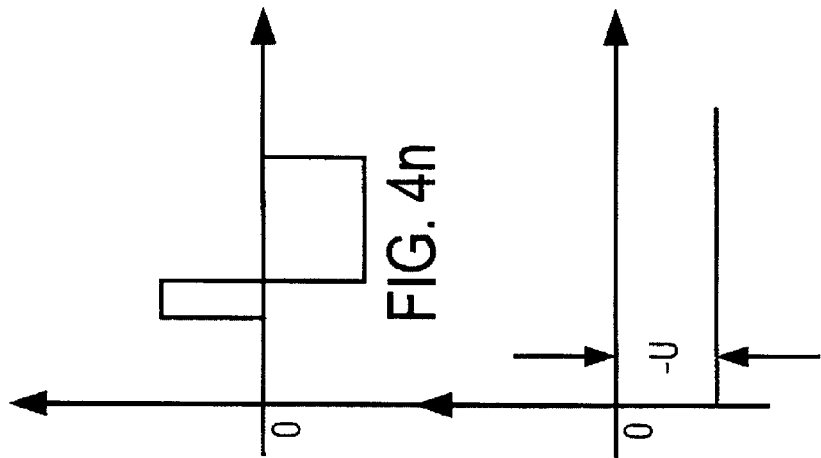
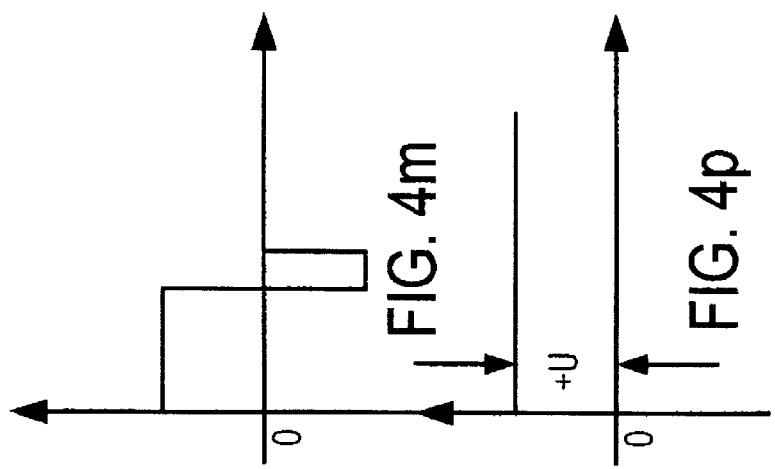
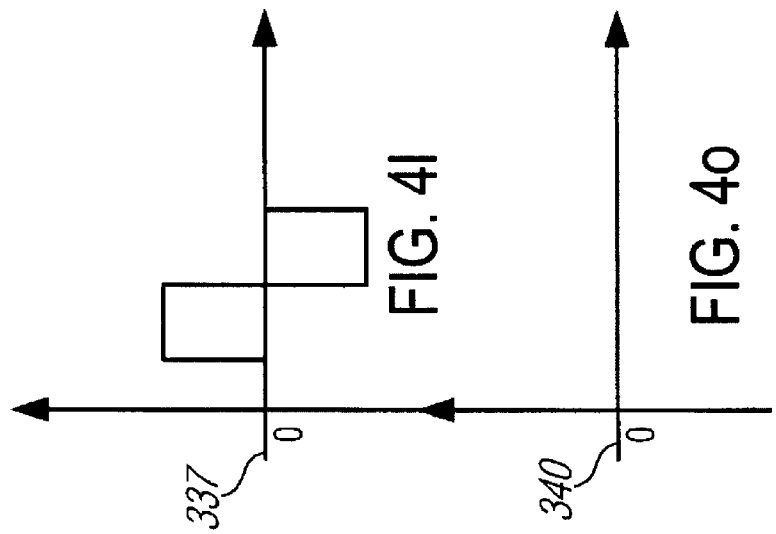

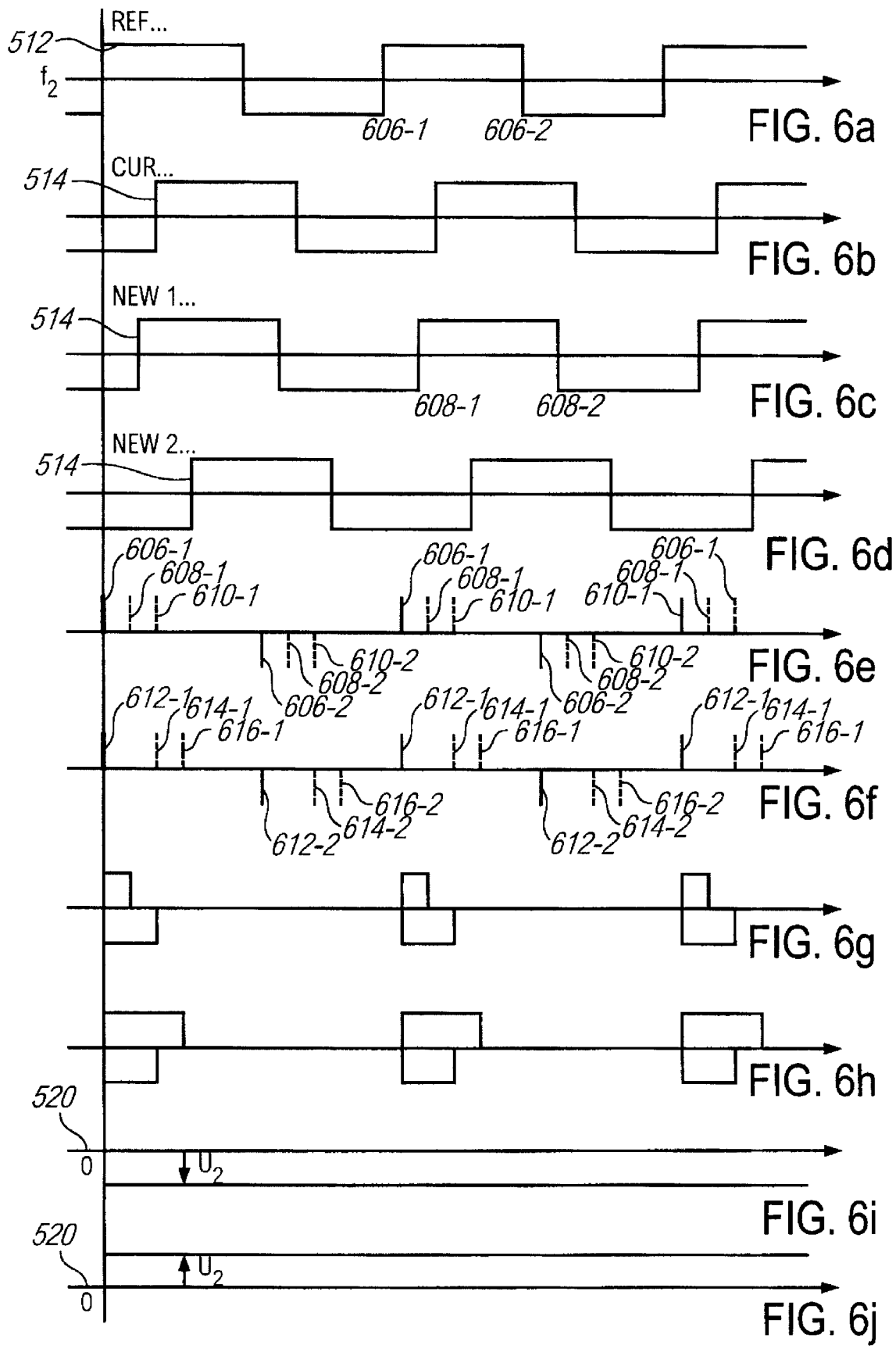

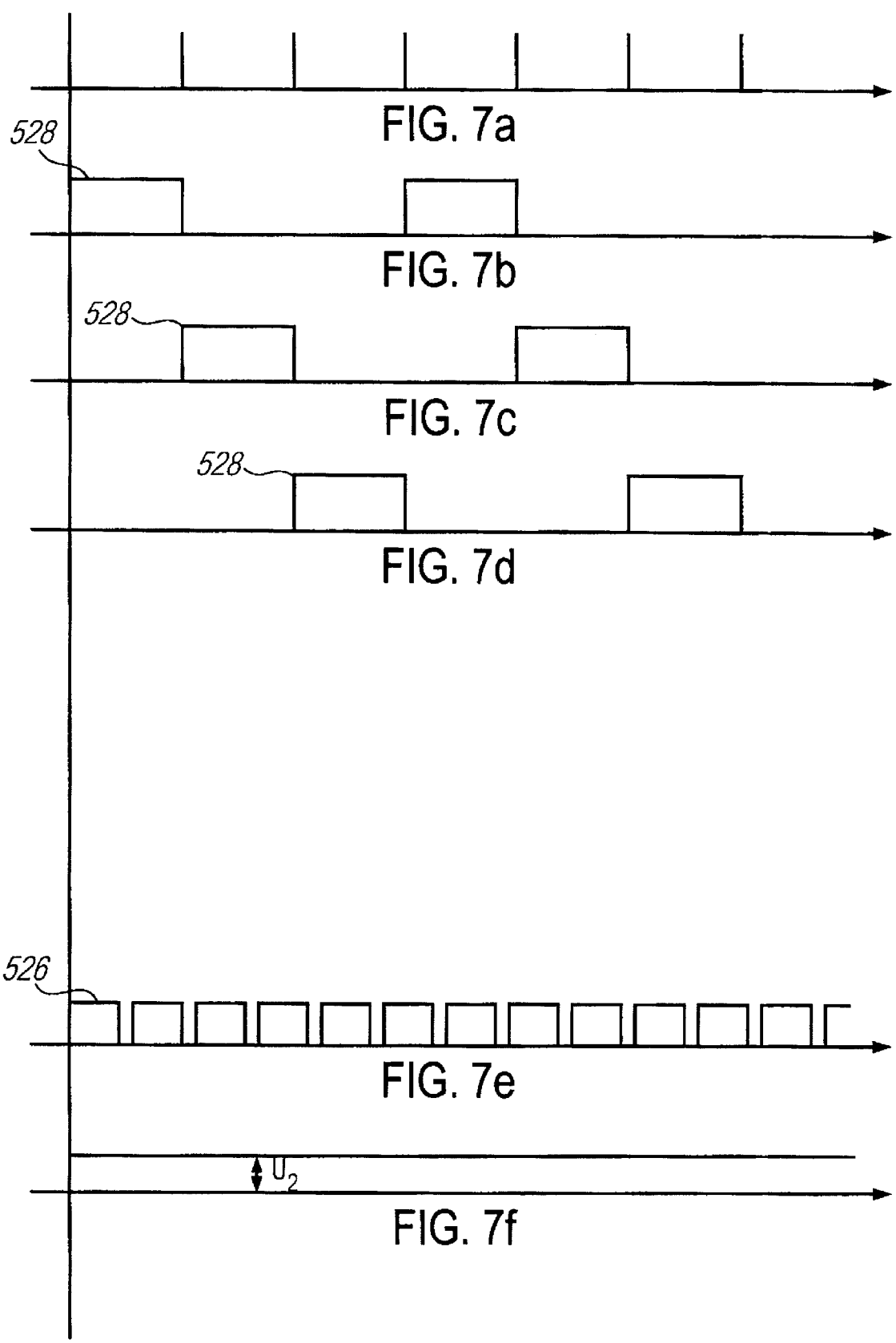

METHOD AND SYSTEMS FOR ELECTRICAL DRIVE CONTROL

FIELD OF THE INVENTION

This invention relates to the control of electrical drives, such as direct current (DC), alternating current (AC), and stepping motors, and more particularly relates to controlling such electrical drives using the phase shift of an auxiliary generator as a primary information signal.

BACKGROUND OF THE INVENTION

Improving the efficiency of electrical drives control is of great importance in modern industry and common life. Electrical drives of different types are used in large numbers in factories, in transport, in laboratories, offices, private homes and so forth. Studies indicate that a typical family in the United States owns over 60 motors which make life more comfortable and efficient. Production of electrical motors is estimated in the millions per day. Such enormous use of electrical motors underscores the problem of effective control of electrical drives.

Control of electrical drives begins by determining the rotor position and speed. There are several ways to determine such parameters. First, the position of the rotor may be determined by an array of phototransistors and a special shutter coupled to the rotor shaft, or by using Hall-effect sensors. Such systems are described in T. Kenjo, *Electrical Motors and Their Controls*, Oxford University Press, (1994), 176 pp. Second, the speed signal may be obtained by using a small permanent magnet tachometer generator, attached to the drive, or by using magnetic or optical sensors generating pulses for each angular increment of the rotor. Such systems are described in W. Leonhard, *Control of Electrical Drives*, $2^{nd}$ ed., Springer (1966), 420 pp. Third, a resolver may determine the position of the rotor by a two-phase (sine/cosine) signal at a carrier frequency modulated sinusoidally by the rotation of the rotor. Such a system is described in J. R. Hendershot, Jr. and T. Miller, *Design of Brushless Permanent-Magnet Motors*, Magna Physics Publishing (1994), p. 1–19. However, all these methods have many disadvantages, such as the inability to determine the position of the rotor with high accuracy, the necessity to use different sensors with all auxiliary systems enabling their operations, the lack of a unified approach to the rotor position and speed determining, and the like.

Existing methods of control vary essentially for the regular and stepping motors. For stepping motors, the number and position of steps is determined by the construction and cannot be controlled electronically. Stepping motors are described in T. Kenjo, A. Sugavara, *Stepping Motors and Their Microprocessor Controls*, $2^{nd}$ Edition, Clarendon Press (1994), 280 pp. Attempts to solve this problem using closed loops with selective amplifiers and frequency dividers have not been completely successful, and also have resulted in rigid structures with inefficient methods of control such as direct mechanical or electromagnetic action on the rotor. Such systems are described in A. Abdukayumov, M. Rakov, *Electromechanical Phase Multi-Stable Element*, Patent USSR No. 275529, Bulletin No. 22 (1970), and A. Abdukayumov, M. Rakov, *Electromechanical Phase Multi-Stable Element*, USSR Patent No. 315274, Bulletin No. 28 (1971). Other systems use structures of a converter of a code in the angular position of an axis of the rotor. Such systems are described in A. Abdukayumov, V. Pogribnoi, M. Rakov, *Converter of the Code in the Angle*, USSR Patent No. 391725, Bulletin No. 31 (1973) and A. Kmet, V. Pogribnoi, M. Rakov, *Converter of the Code in the Angle*, USSR Patent No. 394749, Bulletin No. 34 (1973). These systems are complex and have only a rather limited number of stable states (steps). Because of these disadvantages, such systems have not been further applied to electrical motors. It is desired to create a more effective general method of electrical drive control.

SUMMARY OF THE INVENTION

The present invention provides a method for controlling an electrical drive motor using the phase shift of an auxiliary generator to determine the position of the rotor and thereby control the electrical drive motor. The method includes receiving a primary information signal that is indicative of the position of a drive rotor of the electrical drive motor. The primary information signal is indicative of the phase shift of an auxiliary generator. Control sequences are formed to control the operation of the drive. Control signals are formed responsive to the control sequences and the primary information signal. Power signals are formed responsive to the control signals to control the electrical drive motor.

The present invention also provides a system for controlling the rotational position of a rotor of a motor. A control unit receives an information signal indicative of the rotational position of the rotor. The information signal has a phase indicative of the rotational position of the rotor. In response to the information signals, the control unit provides first and second control signals to a power unit. The power unit provides a position control signal to the motor.

The systems of the present invention advantageously provides position control signals to motors for causing rotation of a rotor of the motor in user selectable steps or for constant rotation.

BRIEF DESCRIPTION OF THE DRAWINGS

FIG. 3 is a block diagram illustrating a motor control system in accordance with a second embodiment of the present invention.

FIGS. 4a–4q are timing diagrams of the motor control system of FIG. 3.

FIGS. 6a–6j are timing diagrams illustrating the timing of signals for the motor control system of FIG. 5 in a stepping mode.

FIGS. 7a–7f are timing diagrams illustrating the timing of signals for controlling a motor control system that includes brushless motor.

DETAILED DESCRIPTION OF THE PREFERRED EMBODIMENTS

Figure 1:
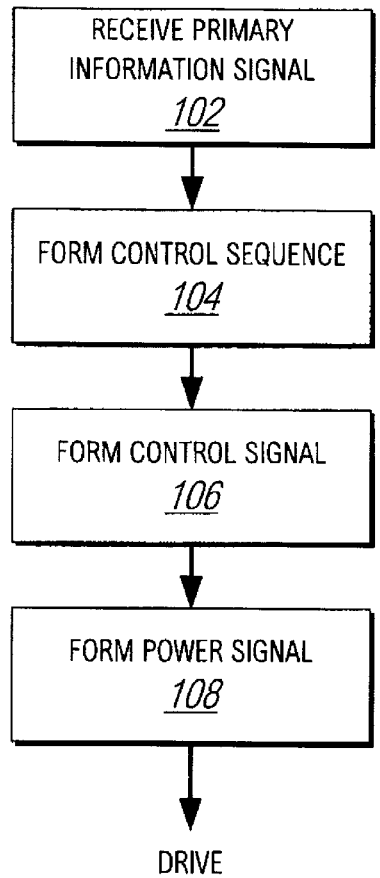
FIG. 1 is a flow chart illustrating the operation of a motor control system in accordance with the present invention.
Figure 2:
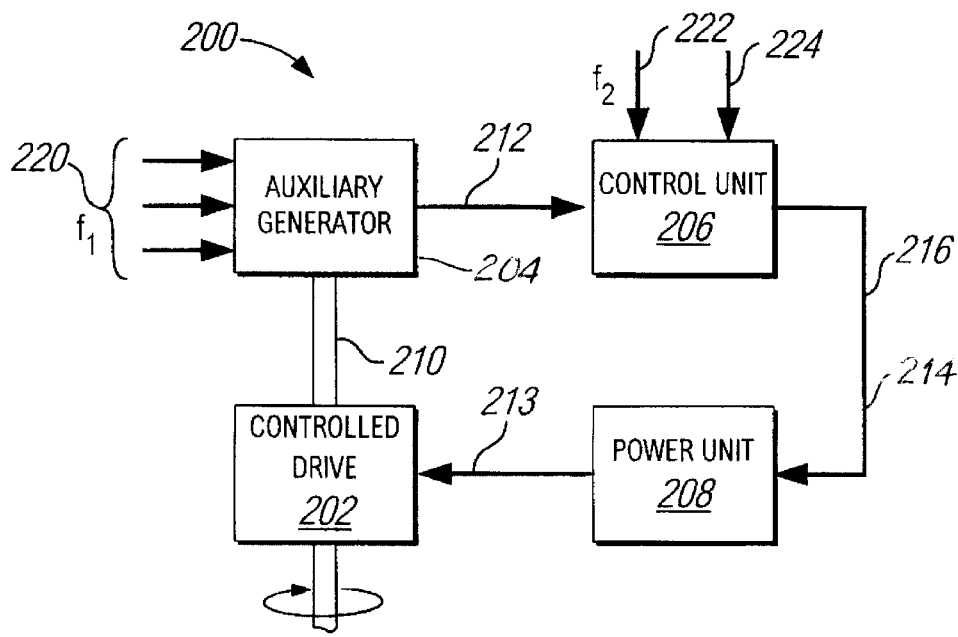
FIG. 2 is a block diagram illustrating a motor control system in accordance with a first embodiment of the present invention.

Referring now to FIG. 1, there is shown a flow chart illustrating the operation of a motor control system, and referring to FIG. 2, there is shown a block diagram illustrating a motor control system 200 in accordance with a first embodiment of the present invention. The motor control system 200 includes a controlled drive 202, an auxiliary generator 204, a control unit 206, and a power unit 208. A shaft 210 is connected on one end to a rotor (not shown) of the controlled drive 202, and is connected on another end to a rotor (not shown) of the auxiliary generator 204. The auxiliary generator 204 may be, for example, a conventional multi-phase generator with rotational electromagnetic field and an output winding. The controlled drive 202 may be, for example, a conventional controlled drive.

The auxiliary generator 204 provides to the control unit 206 a primary information signal 212 indicative of the rotational position of the rotor of the controlled drive 202. The control unit 206 monitors the primary information signal 212 and provides position control signals 214, 216 to the power unit 208. In response to the position control signals 214, 216, the power unit 208 provides a power control signal 218 to the controlled drive 202 for controlling the rotation of its rotor.

A reference signal 220, preferably multi-phase (harmonic or quasi-harmonic), having a number of phases p and a frequency $f_1$ is applied by an external multi-phase power supply (not shown) to input windings (not shown) of the auxiliary generator 204. The auxiliary generator 204 includes output windings (not shown) that produce the primary information signal 212 that is a result of interaction of the rotating electromagnetic field with the output winding. The primary information signal 212 has the same frequency $f_1$ as the multi-phase reference signal 220 and has a phase shift $\phi$ that is directly proportional to the angular position of the rotor (not shown) of the auxiliary generator 204 relative to its stator (not shown). The reference signal 220 may be, for example, a square wave.

The input windings of the auxiliary generator 204 may be either on the stator or on the rotor of the auxiliary generator 204. Correspondingly, the output windings of the auxiliary generator 204 may be on the rotor or the stator. The number of phases of the output windings is equal to r. For clarity in the description below, it is assumed that the input winding is disposed on the stator, and that the output windings are disposed on the rotor, and that the number of phases of the stator and rotor are equal correspondingly to, for example, p=3 and r=1. In this example, the information signal 212 of the auxiliary generator 204 has a frequency $f_1$ and a phase shift $\phi$ and is applied to the control unit 206.

One input of the control unit 206 is coupled to an external signal generator (not shown) for receiving a second reference signal 222. The reference signal 222 may be, for example, a square wave having a frequency $f_2$. Of course, the external multi-phase power supply and the external pulse generator may be integral. The clock signal may be derived from the multi-phase voltage signal or vice versa. Another input of the control input 206 receives a programming control signal 224 from an external source (not shown). The programming control signal 224 indicates a user selected position for controlling the operation of the control unit 206.

The operation of the system 200 is determined by the logic of the control unit 206 and is independent of the construction of the controlled drive 202 or the auxiliary generator 204. Accordingly, the system 200 is extremely flexible and able to perform various types of operations without changes of either the construction or connections in the system. The control of the controlled drive 202 depends on the interrelationship of the frequencies $f_1$ and $f_2$ and the control signals produced by the control unit 206.

The motor control system 200 determines the position and speed of the rotor of the controlled drive 202 from the phase shift of the primary information signal 212 from the auxiliary generator 204. The phase shift of the primary information signal 212 of the auxiliary generator 204 is proportional to the angular position of its rotor, and hence to the position of the rotor of the controlled drive 202. The control unit 206 processes the primary information signal 212 to form control sequences 214, 216 for controlling the operation of the controlled drive 202. Such processing includes forming rectangular and/or pulse signals from the primary information signal 212. The control sequences operate to define to the control unit 206 the selected position of equilibrium. The control unit 206 applies the control sequences 214, 216 after interaction with the primary information signal 212 to an input of the power unit 208. In response to control signals 214, 216 from the control unit 206, the power unit provides the power control signal 218 to an input of the controlled drive 202. The power control signal 218 may be, for example, a drive current.

Referring specifically to FIG. 1, in the method of the present invention, an external multi-phase voltage supply (not shown) provides the multi-phase reference signal 220 having a frequency $f_1$ to the auxiliary generator 204. The auxiliary generator 204 provides the primary information signal 212 indicative of the position of the drive rotor in the form of a phase shift of the primary information signal (step 102). The auxiliary generator 204 provides the primary information signal 212 to a first input of the control unit 206. In response to the primary information signal 212 and the second reference signal 222, the control unit 206 forms control sequences 214, 216 to control the operation of the control drive 202 (step 104). The control unit 206 forms control signals in response to the control sequences and the primary information signal (step 106). The control signals 214, 216 are indicative of the positions of the control sequences with respect to the primary information signal, and thus are indicative of the positional differences between the current position of the rotor and the user selected position indicated by the user selected command 224. The power unit 208 forms power control signals 218 for controlling the controlled drive 202 (step 108).

The control unit 206 monitors the position of the rotor and generates control signals that the power unit 208 uses to drive the control drive 202. As the rotor rotates, the primary information signal 212 indicates a different position, and in response the control unit 206 alters the control signals.

Two additional embodiments of the present invention are described below. In a second embodiment of the present invention, the control signal has an amplitude that is independent of the position difference between the current and the selected positions of the rotor, except for voltage polarity that is indicative of the direction of rotation of the rotor, and except for a range of position differences near the position of the changing voltage polarity. In this range, the amplitude of the control signal also changes. In this embodiment, the rotor is moved in single steps, whose size may be user selected. Commands to move the rotor by a distance greater than a single step are processed as a sequence of single steps. The motor control system in the second embodiment of the present invention is relatively simple, and provides a control signal and movement of the rotor that is unproportional to the distance between the current and selected positions of the rotor.

In a third embodiment of the present invention, the amplitude of the control signal is proportional to the distance between the selected position and the current position of the rotor. The rotor may be moved from any stable position to any other stable position. The motor control system in the third embodiment of the present invention is more complex than the system of the second embodiment but provides a control signal and movement of the rotor that is proportional to the distance between the current and selected positions of the rotor.

Both embodiments have a number n states that provide a number n stable equilibrium points that are separated by a number n points of unstable equilibrium that is shifted by n phase π (180 degrees) with respect to each other. The number n may be user selected by either selecting n as a ratio of the frequency of the reference signals or by selecting frequencies of references signals applied to the motor control system as described below.

Referring to FIG. 3, there is shown a block diagram illustrating a motor control system 300 in accordance with the second embodiment of the present invention. The motor control system 300 includes a controlled drive 202, an auxiliary generator 204, a shaft 210, a control unit 306, and a power unit 308. The control unit 306 includes a frequency divider/phase splitter 310, a function generator 312, a pulse former 314, and an electronic switch 316. The power unit 308 includes an amplifier 318 and a low bandpass filter 320.

A first reference signal 322 is applied to an input of the frequency divider/phase splitter 310. The first reference signal 322 preferably is a square wave having a frequency nf. The frequency divider and phase splitter 310 divides the frequency of the first reference signal 322 to generate a plurality of phase-shifted divided signals 324-1 through 324-3. Each phase-shifted divided signal 324 preferably is a square wave having a frequency f. The ratio n may be user selected.

For illustrative purposes, this description describes three phase-shifted divided signals 324 equally separated in phase, or 120° phase shift between the signals 324. Specifically, the frequency divider and phase splitter 310 generates the first phase-shifted signal 324-1 having a modulation sin (2πft), the second phase-shifted signal 324-2 having a modulation sin (2πft+120°), and the third phase-shifted signal 324-3 having a modulation sin (2πft+240°). The phase-shifted divided signals 324-1 through 324-3 are applied to the auxiliary generator 204. In one embodiment, selective amplifiers (not shown) may be coupled between the control unit 306 and the auxiliary generator 204 to amplify the phase-shifted divided signals 324 and to convert the signals into sinusoidal or quasi-sinusoidal signals. In one embodiment, the phase-shifted signals 324-1 through 324-3 are pulse width modulated quasi-sinusoidal signals.

The auxiliary generator 204 receives the phase-shifted signals 324-1 through 324-3 from the frequency divider/phase splitter 310 and generates an information signal 326 having a phase shift φ relative to the first reference signal 322. The information signal 326 is defined by the equation:

$$I = U_m \sin(2\pi ft + \phi) \quad (1)$$

where $U_m$ is the amplitude of the information signal 326, f is the frequency of the information signal 326, and φ is the phase shift of the information signal 326.

In response to the information signal 326, the pulse former 314 generates an impulse signal 328 having a constant positive amplitude when the amplitude of the information signal 326 is positive and having a constant negative amplitude when the amplitude of the information signal 326 is negative. Because the information signal 326 has a phase shift φ relative to the first reference signal 322, the impulse signal 328 also has a phase shift φ relative to the first reference signal 322. The pulse former 314 generates a pulse signal 328 having a short pulse width in response to a negative-to-positive amplitude transition of the information signal 326.

In response to the first reference signal 322 and to a user selected step command 330, the frequency divider/phase splitter 310 provides a second reference signal 332 to the function generator 312. In response to the reference signal 332, a user selected position command 334, and a directional command 336, the function generator 312 provides a third reference signal 335 to an input of the electronic switch 316. Of course, the user selected position command 334 and the directional command 336 may be combined into a single command. The directional command 336 indicates the direction of rotation of the rotor 210.

The electronic switch 316 determines the phase difference between the pulse signal 328 and the third reference signal 335 and generates a control signal 337, which is applied to an input of the amplifier 318, which amplifies the signal and applies an amplified signal 338 to an input of the filter 320. The low frequency filter 318 filters the amplified signal to remove high frequency noise and generate a power control signal 340 for controlling the drive of the controlled drive 202.

Referring to FIGS. 4a–4l, there are shown timing diagrams for the motor control system 300.

Referring specifically to FIG. 4a, there is shown a timing diagram of the first reference signal 322 which preferably is a square wave having a frequency nf.

Referring specifically to FIG. 4b, there is shown a timing diagram of the second reference signal 332, which is frequency divided from the first reference signal 322. The second reference signal 332 is a square wave having a frequency $f_2$. For exemplary purposes, the divide ratio n equals 3.

Referring specifically to FIGS. 4c–4e, there are shown timing diagrams for the phase-shifted signals 324-1 through 324-3. The phase-shifted signals 324-1 through 324-3 have similar waveforms. In particular, each signal 324-1 through 324-3 is a square wave having an identical clock period but equally phase-shifted relative to each other. In the illustrated embodiment, the period of each phase-shifted signal 324 is two clock periods of the second reference signal 332. The phase of the phase-shifted signals 324 is timed with the zero voltage crossing of the second reference signal 332.

Referring specifically to FIGS. 4f–4h, there are shown timing diagrams for amplified phase-shifted signals in one embodiment using selective amplifiers to form quasi-sinusoidal signals. The amplified phase shift signals have zero crossings, coincident with the zero crossing of the respective phased shifted signals.

Referring specifically to FIG. 4i, there is shown a timing diagram of the information signal 326, which has an identical wave shape to the amplified phase-shifted signals of FIGS. 4f–4h. However, the information signal 326 has a phase shift φ relative to the second reference signal 332 and has a period equal to a time T.

Referring specifically to FIG. 4j, there is shown a timing diagram of the impulse signal 328. The pulse former 314 generates a pulse having a short pulse width in response to a negative to positive zero crossing of the information signal 326. Accordingly, the impulse signal 328 has a phase shift φ relative to the second reference signal 334.

Referring specifically to FIG. 4k, there is shown a timing diagram of the control signal 337. In response to the impulse signal 328, the electronic switch 316 provides the third reference signal 335 when the impulse signal 328 is high, and blocks the third reference signal 335 when the impulse signal 328 is low. A view 400 of a portion of the third reference signal 328 is described below in conjunction with FIGS. 4l–4n Referring to FIGS. 4l–4q, there is shown expanded timing diagrams for the view 400 (FIG. 4k) of the control signal 337 when the current position of the rotor is at, in a small region before, and after the selected position of the rotor, respectively. Referring to FIGS. 4o–4q, there are shown timing diagrams of the power control signal 340 corresponding to FIGS. 4l–4n, respectively. The electronic switch 316 passes the third reference signal 335 when the impulse signal 328 is high and blocks the third reference signal 335 when the impulse signal 328 is low. The amplifier 318 provides a power control signal 338 of constant amplitude, except when the rotor is near the selected position. In these positions, the voltage polarity of the reference signal 335 changes. Accordingly, the electronic switch 316 provides a control signal 337 that has a change in voltage polarity as shown in FIGS. 4l–4n. In these positions, the amplifier 318 provides a power control signal 338 that has an amplitude that is less than the amplitude at farther positions. In particular, the amplitude is proportional to a time integrated amplitude of the control signal 337. The amplitude of the power control signal 338 is positive when the duration of the positive peak of the power control signal 340 is greater than the duration of the negative peak of the power control signal 340, and is negative when the duration of the positive peak of the power control signal 340 is less than the duration of the negative peak of the power control signal 340. The amplitude of the power control signal 338 is zero when the durations of the positive and negative peaks of the power control signal 340 are equal.

The power unit 308 generates a power control signal 340 having an amplitude that is independent of the distance between the actual rotational position of the rotor and the user selected rotational position of the rotor, except for polarity. As the rotor rotates towards the desired position, the phase shift φ of the information signal 326 reduces. When the phase shift is substantially zero, the electronic switch 316 generates a pulse signal 337 having equal positive and negative peaks and thus the amplifier 318 generates a power control signal 340 of zero amplitude. In this case, the drive 202 stops rotating.

The motor control system 300 allows the controlled drive 202 to be rotated in single steps. The step sizes are determined by the ratio n of the frequencies of the reference signals 324, 332. The motor control system 300 provides quasi-proportional movement of the rotor by making the steps sizes sufficiently small and moving through a sequence of single steps. The ratio n may be user selected.

In the third embodiment of the present invention, the amplitude of the power control signal is dependent and proportional to the distance between the current and selected rotational positions of the rotor 210.

Figure 5:
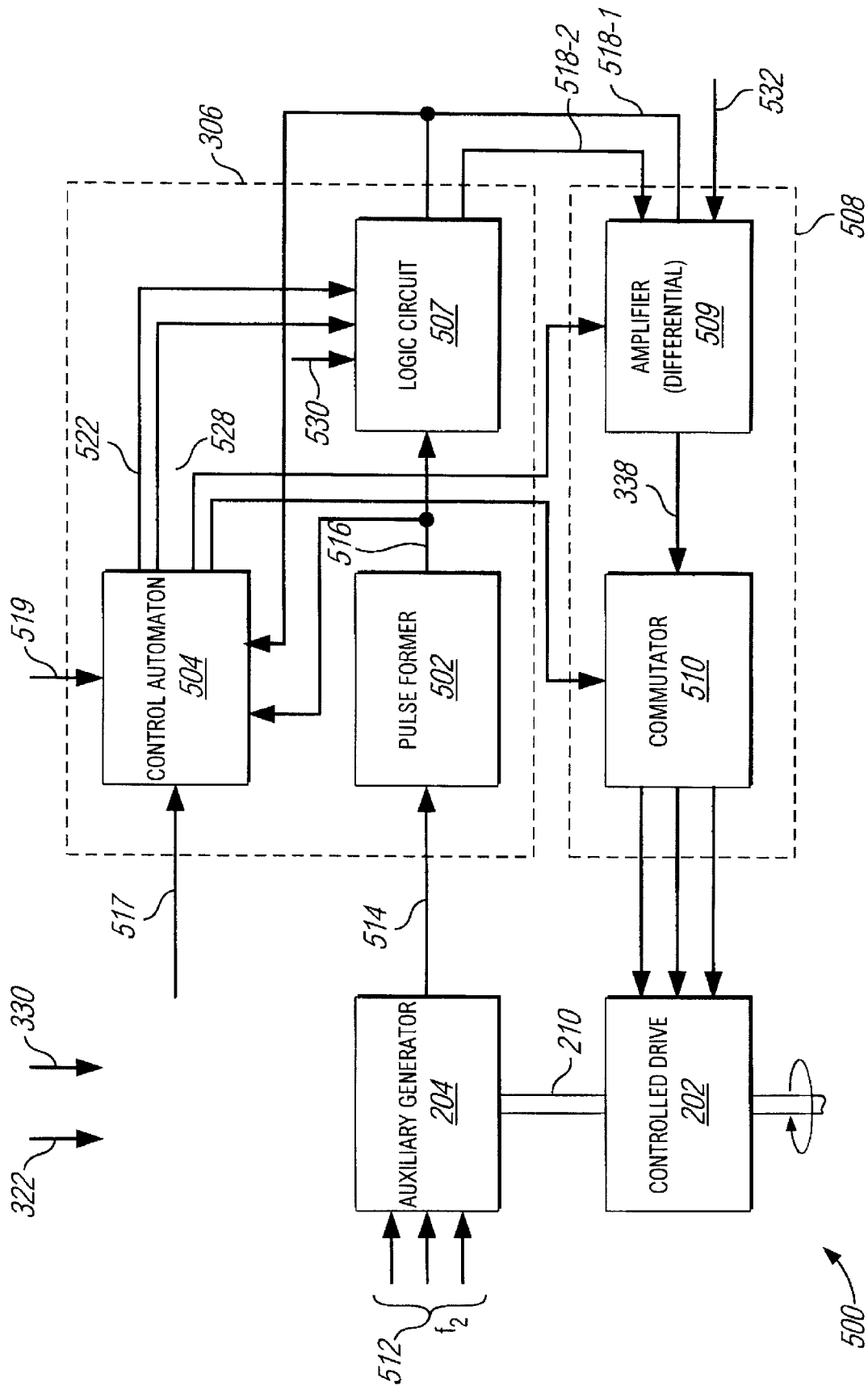
FIG. 5 is a block diagram illustrating a motor control system in accordance with a third embodiment of the present invention.

Referring to FIG. 5, there is shown a block diagram illustrating an electrical control system 500, which includes a controlled drive 202, an auxiliary generator 204, a control unit 506, and a power unit 508. The control unit 506 includes a pulse former 502, a control automaton 504 and a logic circuit 507. The power unit 508 includes an amplifier 509 and a commutator 510.

A reference signal 512, preferably multi-phase (harmonic or quasi-harmonic), having a number of phases p and a frequency $f_1$ is applied to input windings (not shown) of the auxiliary generator 204. For illustrative purposes, the reference signal 512 is a three-phase signal. The auxiliary generator 204 produces a primary information signal 514 having the same frequency $f_1$ as the multi-phase reference signal 512 and having a phase shift φ that is directly proportional to the angular position of the rotor (not shown) of the auxiliary generator 204 relative to its stator (not shown). For clarity, only one signal line is shown for the information signal 514.

In this example, the information signal 514 of the auxiliary generator 204 has a frequency $f_1$ and a phase shift φ and is applied to the pulse former 502 which provides a pulse signal 516 with the same phase shift, to a control input of the logic circuit 507 and to one of the inputs of the control automaton 504. The pulse signal 516 may be, for example, a rectangular and/or pulse waveform. One input of the control automaton 504 is coupled to an external signal generator (not shown) for receiving a reference signal 517, which preferably is a periodic rectangular signal having a frequency $f_2$. Another input of the control automaton 504 is coupled to receive a control signal 519 that indicates a user selected position which then controls the operation of the control unit 506. The control automaton 504 provides a reference signal 522 and a control signal 524 to respective second and third inputs of the logic circuit 507. The control automaton 504 provides an amplifier control signal 526 to the amplifier 509 to adjust the coefficient of amplification by the amplifier 509. The control automaton 504 also provides a control signal 528 to the commutator 510 in a brushless motor system as described below in conjunction with FIGS. 7a–7g.

A disable signal 530 is applied to another input of the logic circuit 507 to disable the receipt of the pulse signal 516 by the logic circuit 507 in a brushless motor system. The logic circuit 507 provides control signals 518-1 and 518-2 to the amplifier 509. The amplifier 509 may be, for example, a conventional differential amplifier.

An external control signal 532 may be applied to another input of the amplifier 509, to control the rotational speed of the rotor.

The operation of the system 500 is determined by the logic of the control unit 506 and is independent of the construction of the controlled drive 202 or other parts of the system. Accordingly, the system 500 is extremely flexible and able to perform various types of operations without changes of either the construction or connections in the system. The control of the controlled drive 202 depends on the interrelationship of the frequencies $f_1$ and $f_2$ and the control sequences produced by the control automaton 504. The controlled drive 200 may be controlled in any number of discrete steps. The total number of possible stable states is equal to the frequency ratio n. The minimal discrete angle is equal to $2\pi/n$. The commutator 510 is permanently in an on position in a stepping mode. The controlled drive 202 may be either a DC motor or an AC motor, in which case the DC voltage signal $U_=$ is applied to the rotor.

In the following description, two of numerous possible operation modes of the proposed system—the stepping operation with variable steps, and control of the brushless DC motor are described. However, it would be obvious to one skilled in the art that the system may operate in other operational modes.

Referring to FIGS. 6a–6j, there are shown timing diagrams for a motor control system 500 in stepping mode.

Referring specifically to FIG. 6a, there is shown a timing diagram of the reference signal 512, which preferably is a square wave having a frequency $f_2$. Referring to FIGS. 6b–6d, there are shown timing diagrams of the information signal 514 for a current rotational position, and first and second user selected rotational positions, respectively. The first and second user selected positions are shown for illustrative purposes to be before and after the current position to illustrate the operation of the system 500 for rotation in either direction. For illustrative purposes, a positive amplitude control signal corresponds to clockwise movement of the rotor and movement to the right in the timing diagrams, and conversely a negative amplitude control signal corresponds to counter clockwise movement of the rotor and movement to the left in the timing diagrams. In FIG. 6c, the user selected position is to the left of the current rotor position and thus the rotor moves counterclockwise to the first user selected position. Conversely, in FIG. 6d, the user selected position is to the right of the current rotor position and thus the rotor moves clockwise to the second user selected position.

In a stepping mode, the frequency $f_2$ equals n times the frequency $f_1$. The information signal 514 from the auxiliary generator 204 has a phase shift φ proportional to the angle of the rotor. The user selected positions have a phase shifts relative to the information signal 514.

Referring to FIG. 6e, there is shown the timing diagram of the control sequences generated by the control unit 206 when the user selected position is after the current position. Reference control sequences 606-1, and 606-2 (shown as solid lines), are generated for positive and negative transitions, respectively, of the reference signal 512. Selected position control sequences 608-1 and 608-2 (shown as dotted lines) are generated for positive and negative transition, respectively, of a user selected position wave form 602 (FIG. 6c). Current position control sequences 610-1 and 610-2 (shown as dashed lines) are generated for positive and negative transitions, respectively, of a current position wave form 600 (FIG. 6a). The control sequences from the control automaton 504 have a period $1/f_2$ and a desirable phase shift for a particular case.

Referring to FIG. 6f, there is shown the timing diagram of the control sequences generated by the control unit 506. Reference control sequences 612-1 and 612-2 (shown as solid lines) are generated for positive and negative transitions, respectively, of the reference signal 512. Selected position control sequences 616-1 and 616-2 (shown as dotted lines) are generated for positive and negative transitions, respectively, of the user selected position wave form 604 (FIG. 6d). Current position control sequences 614-1 and 614-2 (shown as dashed lines) are generated for positive and negative transitions, respectively, of the current position wave form 600 (FIG. 6a).

Referring specifically to FIG. 6g, there is shown a timing diagram illustrating the phase differences between the pulses of the control sequences corresponding to FIG. 6e.

Referring specifically to FIG. 6h, there is shown a timing diagram of the phase differences corresponding to the control sequences of FIG. 6f. The positive amplitude wave form shown indicates the phase difference between the user selected position and the reference position. The wave form having a negative amplitude indicates the phase difference between the current position and the reference signal. The logic circuit 507 measures the two distances, or time intervals, (1) between pulses of the basic sequence 606 and 612 (corresponding to a phase shift $\phi_0$ equals zero) and pulses of the present sequence 610 and 614 (corresponding to the phase shift $\phi_p$) and (2) between pulses of the basic sequence 606 and 612 ($\phi_0$ equals zero) and pulses of the next sequence 608 and 616 (corresponding to $\phi_n$).

Referring to FIGS. 6i–6j, there are shown timing diagrams of a DC power control signal 520 corresponding to FIGS. 6g and 6h, respectively. These pulses are applied to the inputs of the differential amplifier 509 having a low band filter to form a power control signal 520 that is proportional to the difference of the two distances. This voltage has a different sign (positive or negative) depending on which of the distances is greater. If $\phi_p$ is less than $\phi_n$, the DC voltage $U_-$ of the power control signal 510 is greater than zero and the drive moves clockwise. If the phase shift $\phi_p$ is greater than $\phi_n$ than the DC voltage $U_-$ is less than zero and the drive moves counterclockwise. A DC voltage $U_-$ equal to zero corresponds to a stable state that lasts until the next control signal, i.e., the next sequence from the control automaton 504. The amplitude of the power control signal 520 is proportional to the measured distance (or time interval) between the current position and the selected position. As the rotor moves to the user selected position, the relative phase difference and measured distance decreases, and thus the amplitude of the power control signal 520 decreases. When the selective phase difference is zero, the amplitude of the power control signal 520 is zero. In this case, the drive 202 stops rotating.

Referring to FIG. 7a, there is shown a timing diagram of the reference signal for a brushless motor system.

Referring to FIGS. 7b–7d, there are shown the timing diagrams of control signals 528 produced by the control automaton 504 for controlling the application of the power control signal 520 to the commutator 520.

Referring to FIG. 7e, there is shown a timing diagram for the control signal 526. The operation of a brushless motor is now described. As with the stepping motor, the reference frequencies are $f_1$ and $f_2$ equals n times $f_1$. The information signal 514 from the auxiliary generator 204 has a phase shift φ and is applied to the input of the control automaton 504. However, for a brushless motor, the output signal is not applied to the input of the logic circuit 507, i.e., the signal is blocked at the input in response to the signal 530. The control automaton 504 forms two sets of sequences. The first sequence 524 is applied to the logic circuit 507 and determines the level of the output DC signal. The other set of sequences controls the switching of the commutator 510. In this case, three control signals corresponding to those obtained from the photo diodes, or pulse sensors in known systems, are generated as shown in FIGS. 7b–7d. However, in the system of the present invention, these signals are produced by the control automaton 504 which, in turn, is controlled by the position of the rotor of the auxiliary generator 204, and, thereby, of the controlled drive 202.

Referring specifically to FIG. 7f, there is shown the timing diagram of the power control signal 520. The speed of a rotation is determined by the amplitude $U_-$ of the DC power control signal 520 and is again under control of the control automaton 504. The input DC signal may be applied to the amplifier 509 from an external source rather than from the input of the logic circuit 507. In this case, the control automaton 504 controls the coefficient of amplification.

In one embodiment, the ratio n of the frequencies of the reference signals may be a rational number p/q where the frequency of one reference signal is $pf_1$ and the frequency of the other reference signal is $qf_1$.

What is claimed:

1. A method comprising:
   forming a reference signal having a first frequency,
   receiving a primary information signal having a second frequency and being indicative of the position of a drive rotor, the ratio of the first frequency and the second frequency being a rational number n;
   forming control sequences that determine a logic sequence for operation of a drive;
   forming control signals responsive to the control sequences and the primary information signal;
   forming power signals from said control signals, and controlling the drive with said power signals, wherein the ratio n is user selected.

2. The method of claim 1 wherein the primary information signal has a phase shift indicative of a rotational position of the drive rotor.

3. A system for controlling the rotational position of a rotor of a motor, comprising:
- a control unit having a first input for receiving an information signal indicative of the rotational position of the rotor, having a second input for receiving a reference signal, having a third input for receiving a position select signal, and having a first output for providing a first position indication signal; and
- a power unit having a first input coupled to the first output of the control unit for receiving the first position signal and having a first output for providing a position control signal to the motor,
- wherein the information signal has a frequency $f_1$, the reference signal has a frequency $f_2$, and the frequency $f_2$ equals a positive rational number n times the frequency $f_1$.

4. A system for controlling the rotational position of a rotor of a motor, comprising:
- a control unit having a first input for receiving an information signal indicative of the rotational position of the rotor, having a second input for receiving a reference signal, having a third input for receiving a position select signal, and having a first output for providing a first position indication signal; and
- a power unit having a first input coupled to the first output of the control unit for receiving the first position signal and having a first output for providing a position control signal to the motor,
- the control unit including a frequency divider that has said second input for receiving the reference signal and also having a first output for providing a second reference signal and having a second output for providing a third reference signal, the first reference signal having a first frequency, the second reference signal having a second frequency; a function generator having a first input coupled to the first output of the frequency divider for receiving said second reference signal, having a second input for receiving a selected position signal, and having an output for providing a third reference signal indicative of the selected position; a pulse former having an input for receiving the information signal and having an output for providing a pulse signal indicative of the phase of the information signal; and a switch having a first input coupled to the output of the function generator for receiving the third reference signal, having a second input coupled to the output of the pulse former, and having an output for providing the first position indication signal in response to the pulse signal and the third reference signal.

5. The system of claim 4 wherein the information signal has a phase indicative of the position of the rotor.

6. The system of claim 4 wherein the first frequency equals n times the second frequency.

7. The system of claim 6 wherein the number n is user selected.

8. The system of claim 7 wherein the information signal has a phase indicative of the position of the rotor.

9. The system of claim 4 wherein the first position indication signal has an amplitude equal to the amplitude of the third reference signal when the pulse signal has an amplitude in a first range and has a zero amplitude when the pulse signal has an amplitude in a second range.

10. The system of claim 4 wherein the control unit comprises:
- a pulse former having an input for receiving the information signal and having an output for providing a pulse signal having a phase substantially equal to the phase of the information signal; and
- a control automaton having a first input for receiving the position select signal, having a second input for receiving the reference signal, having a first output for providing a control sequence, indicative of the selected position and of the position of the rotor and having a second output for providing a timing signal; and
- a logic unit having a first input for receiving the control sequence, having a second input for receiving the timing signal, having a third input for receiving the pulse signal, and having an output for providing the position indication signal indicative of the phase difference between the information signal and the pulse signal.

11. The system of claim 10 wherein the information signal has a phase indicative of the position of the rotor.

12. The system of claim 10 wherein the first reference signal has a first frequency, and the second reference signal has a second frequency, the first frequency equals n times the second frequency.

13. The system of claim 12 wherein the number n is user selected.

14. The system of claim 13 wherein the information signal has a phase indicative of the position of the rotor.

15. A method of controlling the rotational position of the rotor of a motor, comprising
- generating an information signal with a frequency $f_1$ and indicative of the rotational position of the rotor,
- providing a first reference signal with a frequency $f_2$ and with the ratio of $f_2$ and $f_1$ being a rational number n that is user selected,
- providing a position select signal in response to user input,
- producing a position indication signal in response to the reference, information, and position select signals,
- producing a position control signal in response to the position indication signal,
- applying the position control signal to the motor.

16. The method of claim 15, further comprising
- providing a second reference signal in reference to the first reference signal,
- producing the position indication signal in response to the second reference signal and the information and position select signals.

17. The method of claim 16, further comprising
- providing a third reference signal in response to the second reference signal and said position select signal, and
- producing the position indication signal in response to said third reference signal and said information signal.

18. A system for controlling the rotational position of a rotor of a motor comprising
- a multiphase power source;
- a multiphase generator having an input coupled to the power source;
- an output shaft coupled in driving relation to said rotor and an electric output that develops an information signal with a frequency $f_1$ in response to the power source and that indicates the rotational position of the rotor;

a reference signal source providing a reference signal with a frequency $f_2$, the frequency $f_2$ being equal to a rational number n times the frequency $f_1$ wherein n is user controlled;

a user controlled signal source providing a user controlled position select signal;

a control unit having a first input coupled to said electrical output and receiving the information signal, a second input receiving the reference signal, a third input receiving the position selecting signal, and an output that produces a position indication signal in response to the reference, information, and position selecting signals; and a power unit having a first input coupled to the output of the control unit and receiving the position indication signal and further having an output coupled to the motor and producing a position control signal in response to the position indication signal and applying the same to the motor thereby controlling the position of the rotor in accordance with user's selection.

19. A system for controlling the rotational position of the rotor of a motor, comprising, a reference signal generator producing a reference signal having a frequency $f_1$, an information signal generator coupled to the rotor of the motor and producing an information signal that has a frequency $f_2$ that indicates the present rotational position of the rotor, the ratio of frequency $f_1$ and $f_2$ being a rational number n where the ratio n is user controlled, a user controlled signal generator producing a user position-selecting signal that indicates a desired rotational position of the rotor, a controller coupled to each of said signal generators and producing a control signal in response to the reference, information and the position-selecting signals, and a power unit coupled to the controller and producing a power signal from the control signal for application to the motor to achieve said desired rotational position of the rotor.

20. A system for controlling the rotational position of the rotor of a motor, comprising, means for generating a reference signal having a frequency $f_1$, means coupled to the rotor of the motor for generating an information signal that has a frequency $f_2$ and that indicates the present rotational position of the rotor, the ratio of frequency $f_1$ and $f_2$ being a rational number n where the ratio n is user controlled, means for generating a user position-selecting signal that indicates a desired rotational position of the rotor, controller coupled to each of said generating means for producing a control signal in response to the reference, information and the position-selecting signals, and means coupled to the controller for producing a power signal in response to the control signal for application to the motor to achieve said desired rotational position of the rotor.

* * * * *